(12) United States Patent
Muto et al.

(10) Patent No.: US 8,490,642 B2
(45) Date of Patent: Jul. 23, 2013

(54) FUEL-OUTFLOW CHECK VALVE

(75) Inventors: Nobuharu Muto, Saitama-ken (JP); Yasuo Akimoto, Koga (JP); Tsukasa Satou, Tokyo (JP); Kazuya Okazaki, Tokyo (JP); Shunichi Seki, Tokyo (JP)

(73) Assignee: Kyosan Denki Co., Ltd., Koga (JP)

( * ) Notice: Subject to any disclaimer, the term of this patent is extended or adjusted under 35 U.S.C. 154(b) by 851 days.

(21) Appl. No.: 12/000,414

(22) Filed: Dec. 12, 2007

(65) Prior Publication Data

US 2008/0142087 A1 Jun. 19, 2008

(30) Foreign Application Priority Data

Dec. 15, 2006 (JP) ................. 2006-338076

(51) Int. Cl.
*F16K 24/04* (2006.01)
(52) U.S. Cl.
USPC ........................................... 137/202; 137/43
(58) Field of Classification Search
USPC .................................................. 137/43, 202
See application file for complete search history.

(56) References Cited

U.S. PATENT DOCUMENTS

| 5,529,086 | A | * | 6/1996 | Kasugai et al. | ............... 137/202 |
|---|---|---|---|---|---|
| 5,605,175 | A | * | 2/1997 | Bergsma et al. | ............. 137/202 |
| 6,016,827 | A | * | 1/2000 | Dawson | .................. 137/202 |
| 6,347,640 | B1 | * | 2/2002 | Meyer | ............................ 137/43 |
| 6,913,295 | B2 | * | 7/2005 | Kimisawa et al. | ............ 285/423 |
| 2003/0066558 | A1 | * | 4/2003 | Muto et al. | .................... 137/202 |

FOREIGN PATENT DOCUMENTS

| JP | A 8-258577 | 10/1996 |
|---|---|---|
| JP | A-09-317933 | 12/1997 |
| JP | A-2001-082270 | 3/2001 |
| JP | A-2002-285929 | 10/2002 |
| JP | A-2003-517142 | 5/2003 |
| JP | A-2005-351293 | 12/2005 |

OTHER PUBLICATIONS

Aug. 16, 2011 Office Action issued in Japanese Patent 2006-338076 (with English Translation).

* cited by examiner

*Primary Examiner* — Craig Schneider
*Assistant Examiner* — Kevin Murphy
(74) *Attorney, Agent, or Firm* — Oliff & Berridge, PLC (57) ABSTRACT

A fuel-outflow check valve includes: a casing, at least one portion of which is located in a fuel tank, the casing having a ventilation hole via which the interior of the casing and the interior of the fuel tank communicate with each other and an upper wall portion protruding inward from the inner peripheral face of the casing; a float that is disposed in the interior of the casing and is vertically movable; and a valve element that is provided on the float and can contact a valve seat formed at the casing.

9 Claims, 9 Drawing Sheets

FIG.1

VALVE CLOSE ←──┼──→ VALVE OPEN

VALVE CLOSE ← → VALVE OPEN

VALVE CLOSE ←—→ VALVE OPEN

FIG. 12 RELATED ART

FUEL-OUTFLOW CHECK VALVE

INCORPORATION BY REFERENCE

The disclosure of Japanese Patent Application No. 2006-338076 filed on Dec. 15, 2006 including the specification, drawings and abstract is incorporated herein by reference in its entirety.

BACKGROUND OF THE INVENTION

1. Field of the Invention

The invention relates to a fuel-outflow check valve that is provided in a ventilation passage extending between a fuel tank and a canister in a vehicle to prevent fuel from flowing out from the fuel tank to the canister when the vehicle has been turned over, when the vehicle is cornering, and the like.

2. Description of the Related Art

In a vehicle (e.g., motor vehicle), a fuel tank is provided which stores fuel supplied to the combustion chambers of the engine of the vehicle. In the fuel tank, a ventilation passage is formed via which air enters and leaves the fuel tank as the amount of fuel in the fuel tank increases or decreases. The ventilation passage is the passage via which the interior of the fuel tank and a canister communicate with each other. If the ventilation passage is provided alone, when the vehicle has been turned over, when the vehicle is cornering, or the like, fuel flows out of the fuel tank and reaches the canister via the ventilation passage and the canister is moistened by the fuel, which may critically damage the canister. To counter this, typically, a fuel-outflow check valve is provided in the upper side of the fuel tank. The fuel-outflow check valve is open in a normal state. When the vehicle has been turned over, when the vehicle is cornering, or the like, the fuel-outflow check valve is closed to prevent the outflow of air and fuel to the canister side.

Figure 12:
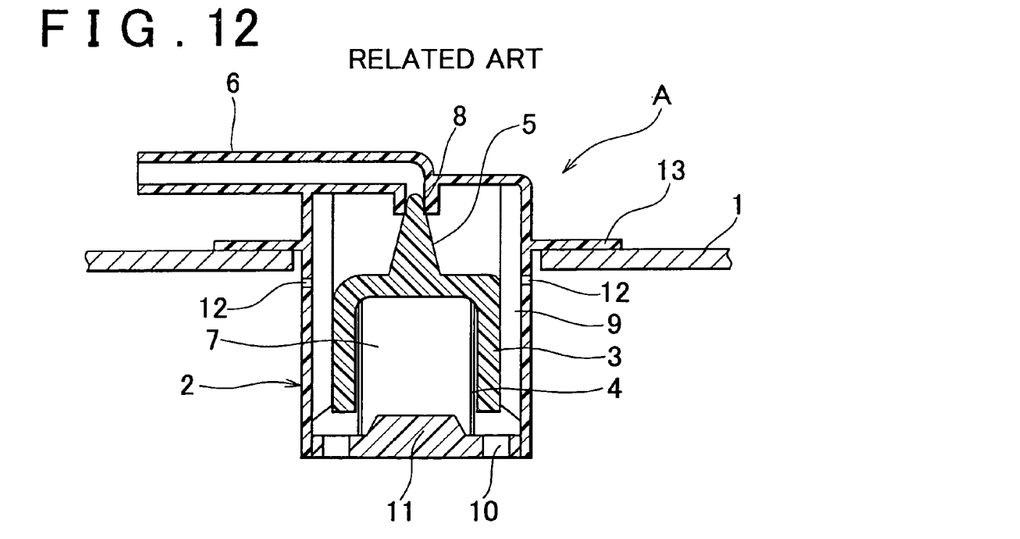
FIG. 12 is a cross-sectional view of a conventional fuel-outflow check valve.

FIG. 12 shows the structure of such a conventional fuel-outflow check valve. A fuel tank 1 mounted in a motor vehicle, or the like, stores fuel to be supplied to the engine of the motor vehicle. A fuel-outflow check valve A is provided in the upper side of the fuel tank 1. The fuel-outflow check valve A is constituted of a casing 2 that is inserted into the fuel tank 1, a float 3 disposed in the casing 2, a spring 4 urging the float 3 upward, a valve element 5 provided on the float 3, a ventilation passage 6 provided downstream of the valve element 5 and leading to a canister (not shown in the drawing), etc.

The casing 2 is a cylindrical container having a hollow structure with a lower opening. A float chamber 7 is formed within the casing 2. A valve seat 8 which the valve element 5 contacts is formed in the upper side of the float chamber 7. Vertical ribs 9 are formed on the inner peripheral face of the casing 2 so as to extend radially. The vertical ribs 9 serve to guide the vertical movement of the float 3. A bottom plate 11 is attached to the bottom of the casing 2. Lower ventilation holes 10 are formed in the bottom plate 11, and side ventilation holes 12 are formed in the side portion of the casing 2. Further, a flange 13 is formed on the upper side of the outer peripheral face of the casing 2. The casing 2 is attached on the fuel tank 1 via the flange 13.

In the fuel-outflow check valve A configured as described above, in a normal state, the float 3 is located at the lower position and thus the valve element 5 is away from the valve seat 8. In this state, fuel vapor in the fuel tank is brought to the canister. Meanwhile, when the vehicle has been turned over, when the vehicle is cornering, or the like, fuel enters the float chamber 7 and the float 3 is lifted up by the buoyant force, and so on, so that the valve element 5 contacts the valve seat 8. As such, the ventilation passage 6 is closed, preventing fuel from flowing toward the canister (For example, refer to Japanese Patent Application Publication No. 08-258577 (JP-A-08-258577)).

Meanwhile, in recent years, there has been an increasing trend of high-response vehicles. Such vehicles are subjected to a relatively large force when starting from standstill, when coming to a stop, when cornering, or the like. Therefore, if a conventional fuel-outflow check valve is used in such a high-response vehicle, there is a possibility that fuel enters the ventilation passage 6 before the valve element 5 closes the ventilation passage 6.

SUMMARY OF THE INVENTION

The invention relates to a fuel-outflow check valve that, when a vehicle is starting from standstill, when the vehicle is coming to a stop, when the vehicle is cornering, or the like, weakens the flow of fuel entering the interior of the fuel-outflow check valve and thus prevents fuel from flowing out to the canister before the valve element of the fuel-outflow check valve reaches the valve seat.

The first aspect of the invention relates to a fuel-outflow check valve including: a casing, at least one portion of which is located in a fuel tank, the casing having a ventilation hole via which the interior of the casing and the interior of the fuel tank communicate with each other and an upper wall portion protruding inward from the inner peripheral face of the casing; a float that is disposed in the interior of the casing and is vertically movable; and a valve element that is provided on the float and can contact a valve seat formed at the casing.

According to this structure, when the vehicle is starting from standstill, when the vehicle is coming to a stop, when the vehicle is cornering, or the like, even if fuel attempts to enter the casing from the lower side, the fuel flow collides with the upper wall portion and thus the dynamic energy of the fuel flow decreases, reducing the chance of the fuel flowing out to the canister before the valve element reaches the valve-close position.

The second aspect of the invention relates to a fuel-outflow check valve including: a casing, at least one portion of which is located in a fuel tank, the casing having a side ventilation hole formed in a side portion of the casing such that the interior of the casing and the interior of the fuel tank communicate with each other via the side ventilation hole; a float that is disposed in the interior of the casing and is vertically movable; and a valve element that is provided on the float and can contact a valve seat formed at the casing, wherein when the valve element is at a valve-open position, a side wall of the float and the side ventilation hole face each other.

According to this structure, when the vehicle is starting from standstill, when the vehicle is coming to a stop, when the vehicle is cornering, or the like, even if fuel attempts to enter the casing laterally, the fuel flow collides with the side wall of the float and thus the dynamic energy of the fuel flow decreases, reducing the chance of the fuel flowing out to the canister before the valve element reaches the valve-close position.

The third aspect of the invention relates to a fuel-outflow check valve, including: a casing, at least one portion of which is located in a fuel tank, the casing having a side ventilation hole formed in a side portion of the casing such that the interior of the casing and the interior of the fuel tank communicate with each other via the side ventilation hole; a float that is disposed in the interior of the casing and is vertically movable, a portion of the top face of the float being slanted downwardly; and a valve element that is provided on the float and can contact a valve seat formed at the casing, wherein when the valve element is at a valve-close position, the lower end of the slanted portion of the top face of the float faces the side ventilation hole of the casing.

When the vehicle is starting from standstill, when the vehicle is coming to a stop, when the vehicle is cornering, or the like, although the valve element is moved to the valve-close position, some fuel enters the area above the float. According to the structure described above, however, because of the slanted portion of the top face of the float, the fuel that flows into the area above the float can be quickly returned to the fuel tank via the side-ventilation hole.

The fourth aspect of the invention relates to a fuel-outflow check valve, including: a casing, at least one portion of which is located in a fuel tank, the casing having a side ventilation hole formed in a side portion of the casing such that the interior of the casing and the interior of the fuel tank communicate with each other via the side ventilation hole; a float which is disposed in the interior of the casing and is vertically movable, an upper opening and a side opening being formed in an upper portion of the float, the upper opening and the side opening being connected via a passage that is slanted downwardly; and a valve element that is provided on the float and can contact a valve seat formed at the casing, wherein when the valve element is at a valve-close position, the lower end of the slanted passage faces the side ventilation hole of the casing.

The fifth aspect of the invention relates to a fuel-outflow check valve, including: a casing, at least one portion of which is located in a fuel tank, the casing having a side ventilation hole formed in a side portion of the casing such that the interior of the casing and the interior of the fuel tank communicate with each other via the side ventilation hole; a float which is disposed in the interior of the casing and is vertically movable, an upper opening and a side opening being formed in an upper portion of the float, the upper opening and the side opening being connected via a passage that is slanted downwardly; and a valve element that is provided on the float and can contact a valve seat formed at the casing, wherein when the valve element is at a valve-open position, a portion of the side wall of the float which is located above the side opening faces the side ventilation hole of the casing, and when the valve element is at a valve-close position, the side opening of the float faces the side ventilation hole of the casing.

According to this structure, when the vehicle is starting from standstill, when the vehicle is coming to a stop, when the vehicle is cornering, or the like, even if fuel attempts to enter the casing laterally, the fuel flow collides with the side wall of the float and thus the dynamic energy of the fuel flow decreases, reducing the chance of the fuel flowing out to the canister before the valve element reaches the valve-close position. Further, because of the slanted passage, the fuel that enters the area above the float when the fuel-outflow valve is closed can be quickly returned to the fuel tank via the side-ventilation hole.

Further, the fuel-outflow check valve according to the second or fifth aspects of the invention may be such that when the valve element is at the valve-open position, the upper end of the side ventilation hole of the casing is located at the same height as or lower than the top face of the float. According to this structure, when the vehicle is starting from standstill, when the vehicle is coming to a stop, when the vehicle is cornering, or the like, even if fuel attempts to enter the casing laterally, the fuel flow collides with the side wall of the float more reliably and thus the dynamic energy of the fuel flow decreases, reducing the chance of the fuel flowing out to the canister before the valve element reaches the valve-close position.

Further, the fuel-outflow check valve according to any one of the third to fifth aspects of the invention may be such that when the valve element is at the valve-close position, the lower end of the side ventilation hole of the casing is located at the same height as or lower than the lower end of the slanted portion of the top face of the float or than the lower end of the side opening of the float. According to this structure, the fuel that enters the area above the float when the fuel-outflow check valve is closed can be quickly returned to the fuel tank via the slanted portion of the top face of the float and the side-ventilation hole of the casing or via the side opening of the float and the side-ventilation hole of the casing.

Further, the fuel-outflow check valve according to any one of the first to fifth aspects of the invention may further include a plate arranged in the lower side of the casing so as to support the float and having a lower ventilation hole facing the bottom portion of the float. According to this structure, when the vehicle is starting from standstill, when the vehicle is coming to a stop, when the vehicle is cornering, or the like, the fuel entering the casing from the lower side pushes the float up, which helps lift the valve element up to the valve-close position.

Further, the fuel-outflow check valve according to any one of the second to fifth aspects of the invention may further include a shield member that is provided on the outer side of the side ventilation hole across an interval. According to this structure, when the vehicle is starting from standstill, when the vehicle is coming to a stop, when the vehicle is cornering, or the like, even if fuel attempts to enter the casing laterally, the fuel collides with the shield member and thus the dynamic energy of the fuel decreases, reducing the chance of the fuel flowing out to the canister before the valve element reaches the valve-close position.

Further, the fuel-outflow check valve according to any one of the second to fifth aspects of the invention may further include a cylindrical member protruding outward from the side ventilation hole of the casing. According to this structure, when the vehicle is starting from standstill, when the vehicle is coming to a stop, when the vehicle is cornering, or the like, even if fuel attempts to enter the casing laterally, the fuel flow is interfered with by the shield member and the amount of fuel that can actually enter the casing decreases, reducing the chance of the fuel flowing out to the canister before the valve element reaches the valve-close position.

Note that the features of the fuel-outflow check valves according to the first to fifth aspects of the invention may be incorporated in various combination as needed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EMBODIMENTS

First Example Embodiment

Figure 1:
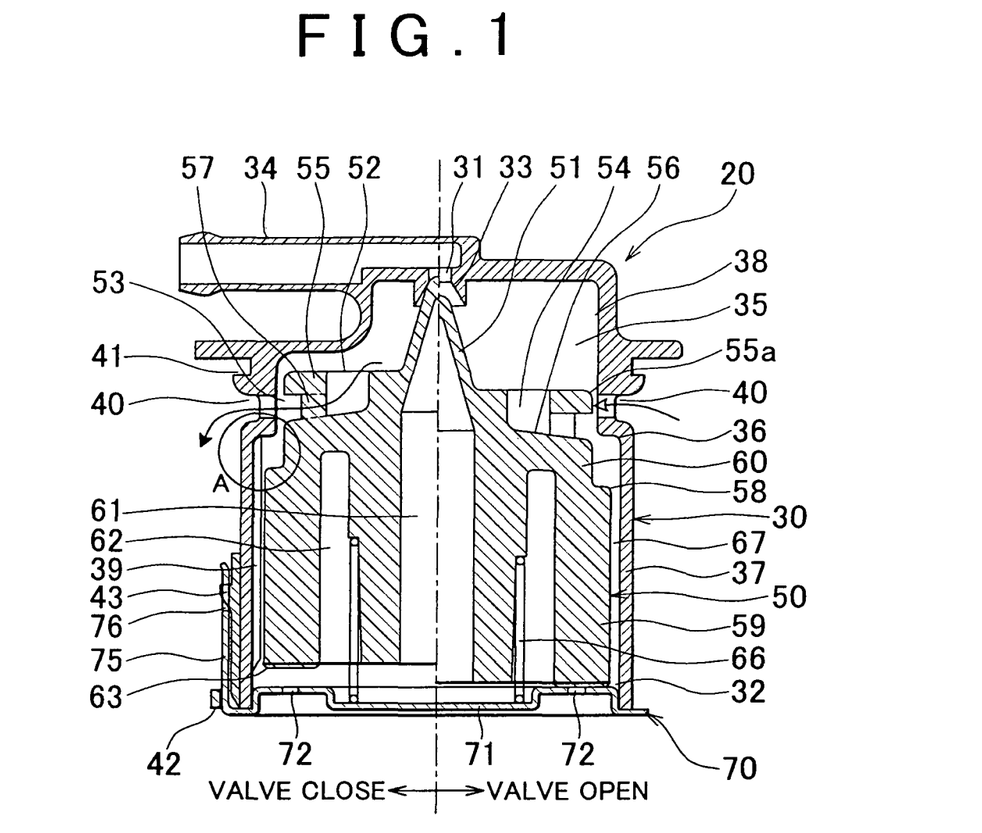
FIG. 1 is a cross-sectional view of a fuel-outflow check valve according to an example embodiment of the invention.
Figure 2:
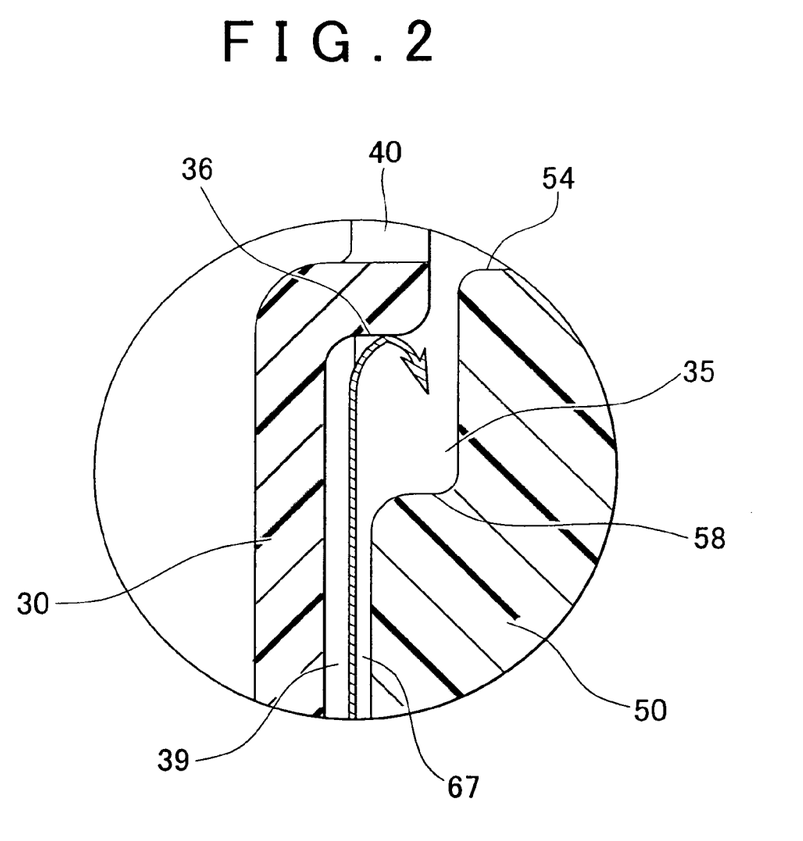
FIG. 2 is an enlarged view of the portion A in FIG. 1.
Figure 3:
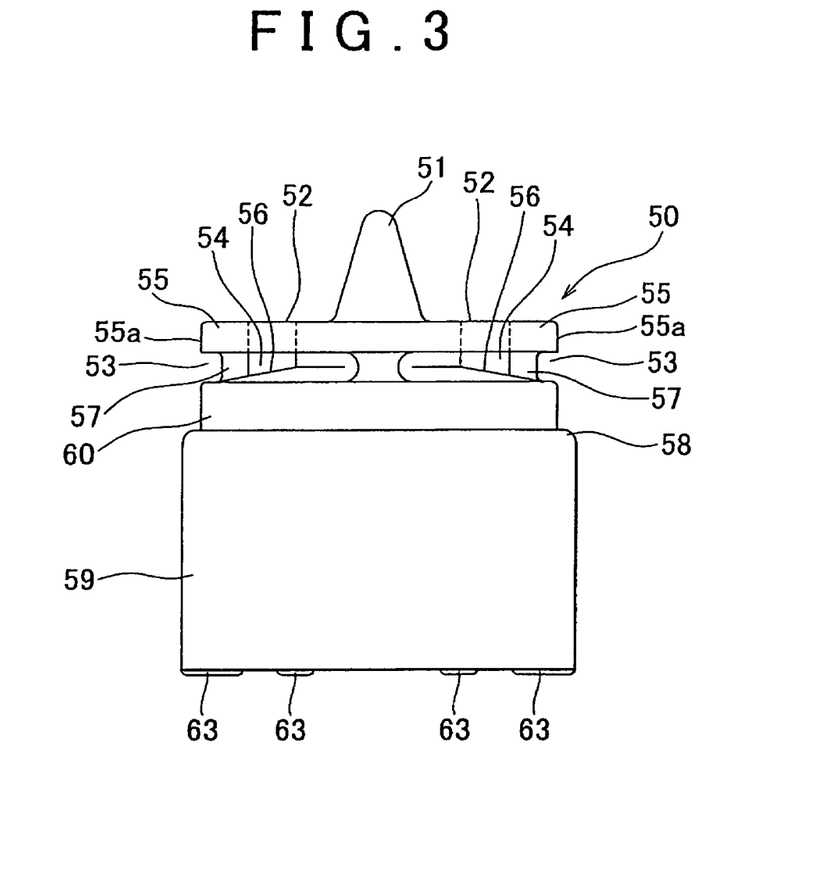
FIG. 3 is a side view of a float of the fuel-outflow check valve according to the example embodiment of the invention.
Figure 4:
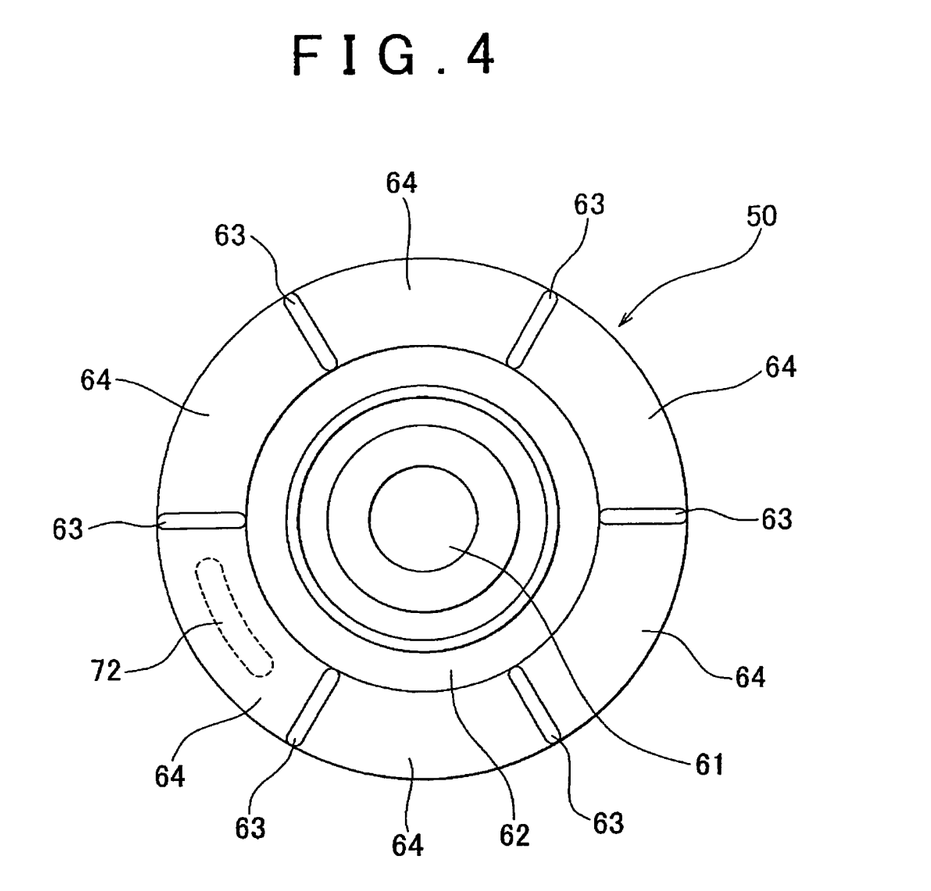
FIG. 4 is a bottom view of the float of the fuel-outflow check valve according to the example embodiment of the invention.
Figure 5:
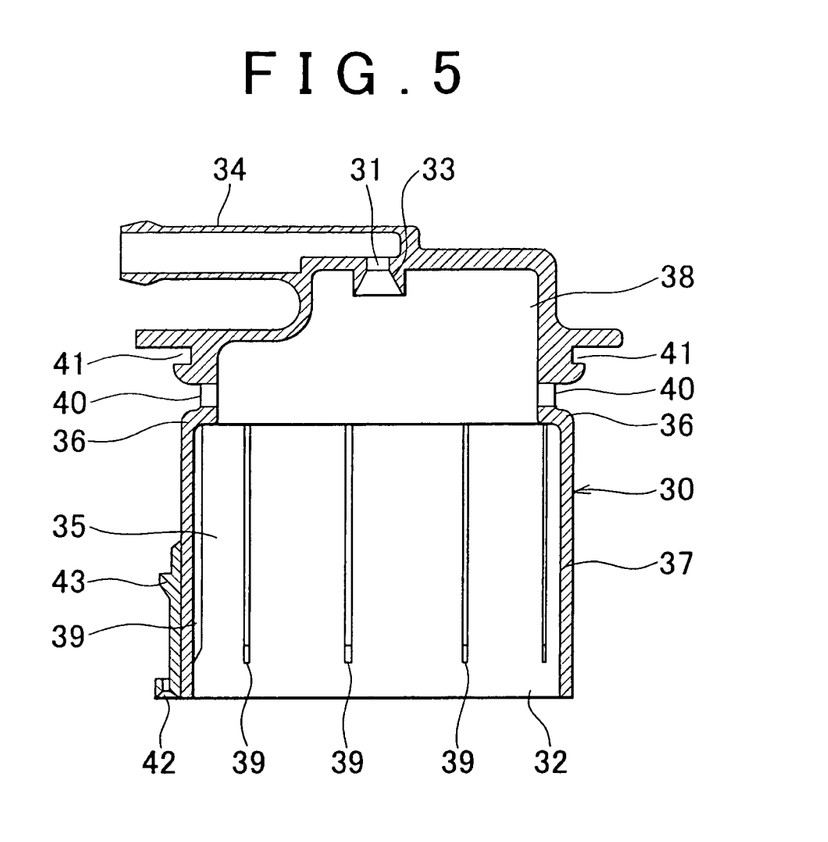
FIG. 5 is a cross-sectional view of a casing of the fuel-outflow check valve according to the example embodiment of the invention.
Figure 6:
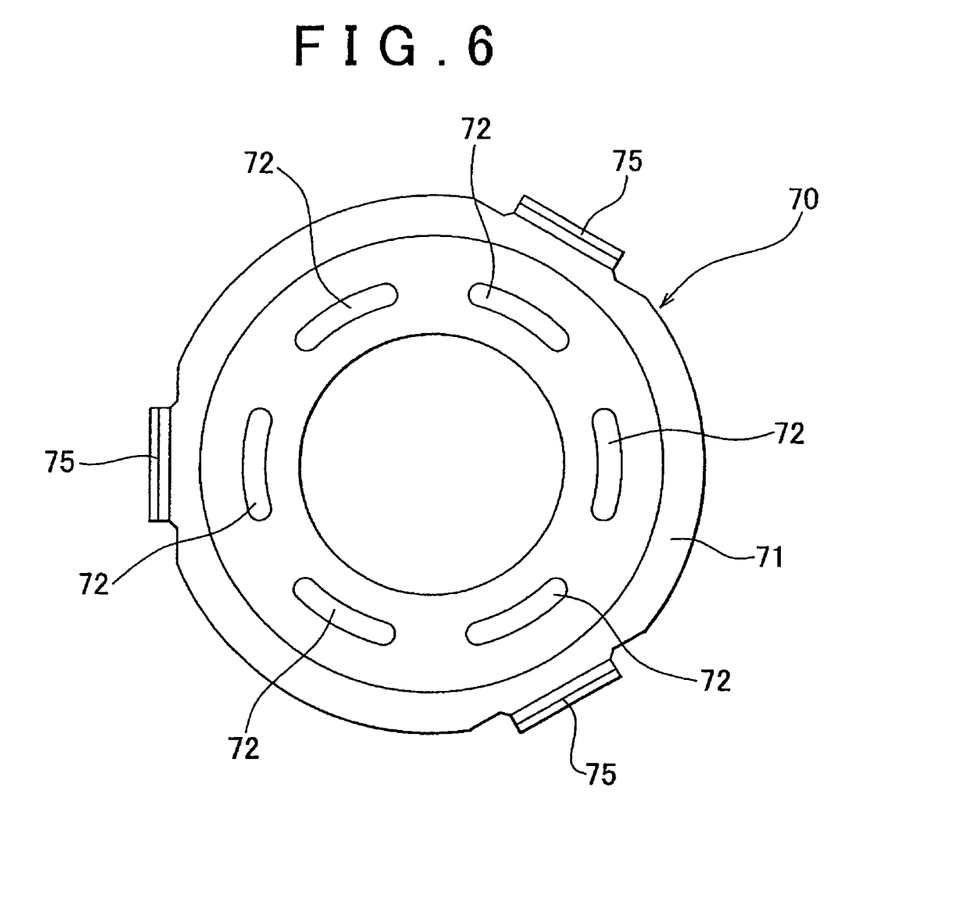
FIG. 6 is a top view of a plate of the fuel-outflow check valve according to the example embodiment of the invention.
Figure 7:
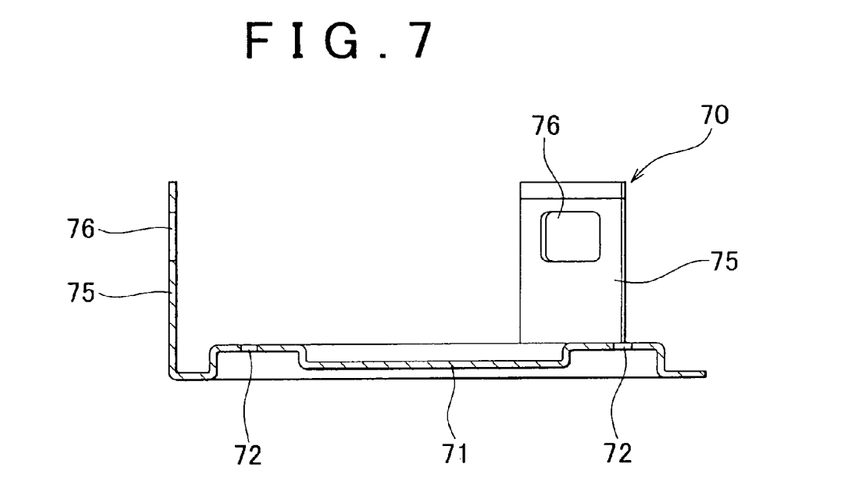
FIG. 7 is a side view of the plate of the fuel-outflow check valve according to the example embodiment of the invention.

FIG. 1 is a cross-sectional view of a fuel-outflow check valve according to the first example embodiment of the invention. FIG. 2 is an enlarged view of the portion A in FIG. 1. FIG. 3 is a side view of a float and FIG. 4 is a bottom view of the same float FIG. 5 is a cross-sectional view of a casing. FIG. 6 is a top view of a plate and FIG. 7 is a side view of the same plate.

A fuel-outflow check valve 20 is disposed in a fuel tank (not shown in the drawings). For example, the fuel-outflow check valve 20 is fixed in position in the fuel tank using a support member (not shown in the drawings), or it is fixed by attaching a flange formed at the periphery of the casing of the fuel-outflow check valve 20 to the top face of the fuel tank, as in the related art structure shown in FIG. 12.

The fuel-outflow check valve 20 is constituted of a casing 30, a float 50, a spring 66, a plate 70, etc. The casing 30 is a cylindrical resin-made case having a hollow structure with an upper opening 31 having a small diameter and a lower opening 32 having a large diameter. The inner face of the small-diameter upper opening 31 forms a valve seat 33, and a ventilation passage 34 is integrally formed on the upper side of the upper opening 31. The ventilation passage 34 leads to a canister (not shown in the drawings) via a pipe that is externally attached to the ventilation passage 34, and fuel vapor in the fuel tank is brought to the canister via the ventilation passage 34 as the fuel tank is ventilated.

Within the casing 30 is formed a float chamber 35 in which the float 50 is disposed. An upper wall 36 is formed on the inner peripheral face of the casing 30. The upper wall 36 is formed at the height higher than the lower opening 32 by about two-third the height of the casing 30, and the width of the upper wall 36 is larger than the width of a passage 67. Below the upper wall 36 is a large-diameter portion 37 of the casing 30. Above the upper wall 36 is, on the other hand, a small-diameter portion 38 of the casing 30. A plurality of vertical ribs 39 are formed at even intervals on the inner peripheral face of the large-diameter portion 37 so as to extend radially. The ribs 39 serve to guide the vertical movement of the float 50. The ribs 39 also reinforce the casing 30.

The ribs 39 may alternatively be formed on the inner peripheral face of the small-diameter portion 38.

Figure 8:
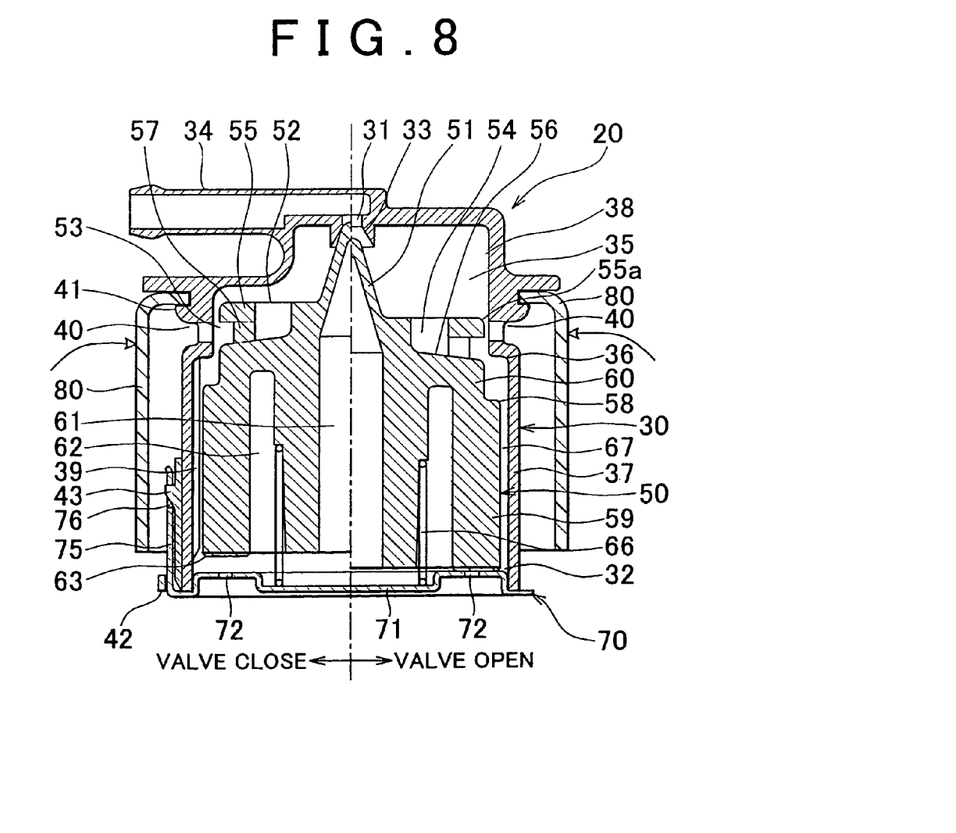
FIG. 8 is a cross-sectional view of a fuel-outflow check valve according to another example embodiment of the invention.

Two side ventilation holes 40 each having a circular cross-sectional shape are provided slightly above the upper wall 36. The side ventilation holes 40 are arranged to face each other in the radial direction. Thus, the outside of the casing 30 (the inner space of the fuel tank when the casing 30 is installed in the fuel tank) and the interior of the small-diameter portion 38 of the casing 30 communicate with each other via the side ventilation holes 40. An annular attachment groove 41 is formed in the outer peripheral face of the casing 30 at the height just above where the side ventilation holes 40 are formed. A shield member 80, which is shown in FIG. 8 and will be described later, is fit in the attachment groove 41.

Three attachment portions for attaching the plate 70, which will be described later, are provided at even intervals on the lower side of the outer peripheral face of the large-diameter portion 37 of the casing 30. Each attachment portion is constituted of a fitting hole 42 having a rectangular cross section and having openings on both the upper and lower sides thereof and a stopper post 43 projecting outward from above the fitting hole 42. FIG. 5 shows a cross-section of the casing 30.

The float 50 is a generally cylindrical resin-made member. A conical valve element 51 is integrally formed upright at the center of the top face of the float 50. The valve element 51 can contact the valve seat 33 of the casing 30. An upper opening 52, which is an annular opening, is formed on the outer side of the valve element 51. The upper opening 52 leads to a side opening 53 via a passage 54. The passage 54 extends obliquely downward from the upper opening 52 and toward the outer side of the float 50 and the passage 54 is generally L-shaped in cross section. The side opening 53 is formed in the outer peripheral face of the float 50 at the height slightly below the upper edge the outer peripheral face of the float 50 so as to extend substantially the entire circumference of the float 50. As such, a ring portion 55 is formed at the upper edge of the outer peripheral face of the float 50.

A side wall face 55a that is the outer peripheral face of the ring portion 55 is arranged to face the side ventilation holes 40 of the casing 30 when the valve element 51 is at the valve-open position as indicated in the right side of FIG. 1, and the side opening 53 is arranged to face the side ventilation holes 40 of the casing 30 when the valve element 51 is at the valve-close position as indicated in the left side of FIG. 1.

The bottom face of the passage 54 is slanted toward the outer side and this slanted bottom face will hereinafter be referred to as "slanted face 56". When the valve element 51 is at the valve-close position, the fuel that enters the area above the float 50 is promptly returned to the fuel tank via the slanted face 56 and the side ventilation holes 40 of the casing 30. Further, four small pillar portions 57 each having a generally rectangular cross section are provided at even intervals between the bottom face of the ring portion 55 and the slanted face 56. The pillar portions 57 support the ring portion 55 on the slanted face 56.

An upper wall 58 is formed in the outer peripheral face of the float 50 at the height lower than the upper edge of the outer peripheral face of the float 50 by about one-third the distance from the top of the casing 30 to the bottom face of the casing 30. Below the upper wall 58 is a large-diameter portion 59. Above the upper wall 58 is, on the other hand, a small-diameter portion 60. The outer dimensions of the large-diameter portion 59 of the float 50 are smaller than the inner dimensions of the large-diameter portion 37 of the casing 30 and larger than the inner dimensions of the small-diameter portion 38 of the casing 30, and the outer dimensions of the small-diameter portion 60 of the float 50 are smaller than the inner dimensions of the small-diameter portion 38 of the casing 30. Further, the upper wall 58 of the float 50, as indicated at the "A" portion of FIG. 1 and shown in FIG. 2, is located below the upper wall 36 of the casing 30 even when the valve element 51 is at the valve-close position. Therefore, when the valve element 51 is at the valve-close position, the fuel flowing from the lower side collides with the upper wall 36 of the casing 30 as indicated by the arrow in FIG. 2, whereby the flow speed of the fuel decreases. Thus, the high-speed upward flow of fuel is weakened at the upper wall 36.

Within the float 50 are formed a center space 61 having an opening on the lower side and having a pencil-like shape and an annular space 62 surrounding the center space 61. A spring 66 is disposed in the annular space 62 as shown in FIG. 1. The spring 66 assists the upward movement of the float 50. That is, although the spring force of the spring 66 is not strong enough to lift the float 50 up alone in the normal state, the spring force of the spring 66, when fuel is flowing into the float chamber 35, acts as an additional force to the buoyant force acting on the float 50 and thus helps lift the float 50 up quickly.

Referring to FIG. 4, six linear ribs 63 are provided at even intervals on the bottom face of the float 50 on the outer side of the annular space 62. The linear ribs 63 extend radially. When the valve element 51 is at the valve-open position, the linear ribs 63 contact the plate 70, whereby ventilation spaces 64, through which fuel vapor can flow, are formed between the upper face of the plate 70 and the bottom face of the float 50.

The plate 70 is a thin plate member made of metal or resin. FIG. 6 is a top view of the plate 70 and FIG. 7 is a cross-sectional view of the plate 70. The plate 70 is constituted of a flat plate portion 71 and three cut-and-raised pieces 75. The flat plate portion 71 is generally circular and is arranged to cover the lower opening 32 of the casing 30. In the flat plate portion 71, six lower ventilation holes 72, which are arc-shaped, are formed at even intervals in a circle. The lower ventilation holes 72 are arranged to face, in the assembled state of the fuel-outflow check valve 20, the portion of the bottom face of the float 50 on the outer side of the annular space 62 (As an example, the position of one lower ventilation hole 72 is indicated by the dashed line in FIG. 4). As such, the fuel flowing into the float chamber 35 via the lower ventilation holes 72 collides with the bottom face of the float 50, whereby the upward flow of the fuel is blocked. However, even in this state, fuel vapor can enter the float chamber 35 via the ventilation spaces 64 that are defined by the linear ribs 63 below the bottom face of the float 50.

The cut-and-raised pieces 75 are three elongated rectangular portions that are integrally formed, at even intervals, at the outer peripheral edge of the flat plate portion 71 and raised perpendicularly. A rectangular attachment hole 76 is formed near the upper end of each cut-and-raised piece 75. The plate 70 is snapped to the casing 30 by fitting the cut-and-raised pieces 75 into the three fitting hole 42, which are provided at even intervals on the outer peripheral face of the large-diameter portion 37 of the casing 30, and then fitting the rectangular attachment holes 76, which are formed near the upper ends of the respective cut-and-raised pieces 75, to the stopper posts 43.

The fuel-outflow check valve 20 is assembled as follows. To begin with, the casing 30 is placed in position such that the lower opening 32 side is up, and then the float 50 is inserted into the lower opening 32 such that the valve element 51 side is down. Then, the spring 66 is inserted into the annular space 62 of the float 50. Next, the plate 70 is placed above the lower opening 32 of the casing 30 such that the cut-and-raised pieces 75 are down. At this time, the plate 70 is set such that the upper ends of the three cut-and-raised pieces 75 face the three fitting holes 42 of the casing 30. Then, the plate 70 is pushed down by applying force to the upper side of the plate 70 so that the cut-and-raised pieces 75 are fit into the fitting holes 42. Then, the plate 70 is further pushed down such that the attachment holes 76 formed near the upper ends of the cut-and-raised pieces 75 are engaged with the stopper posts 43 provided on the outer peripheral face of the casing 30, whereby the casing 30 and the plate 70 are joined together. This is how the fuel-outflow check valve 20 is assembled.

Next, the operation of the fuel-outflow check valve 20 assembled as described above and the advantages obtained with the same valve 20 will be described. First, under the valve-open state where the bottom portion of the float 50 is in contact with the plate 70 as indicated in the right side of FIG. 1, the fuel entering the float chamber 35 via the lower ventilation holes 72 attempts to flow upward through the passage 67 formed between the inner peripheral face of the large-diameter portion 37 of the casing 30 and the outer peripheral face of the large-diameter portion 59 of the float 50. However, this upwardly-flowing fuel, as indicated by the arrow in FIG. 2, collides with the upper wall 36 of the casing 30, and therefore its upward movement is suppressed, whereby the time taken for the fuel to reach the upper opening 31 is prolonged. As a result, the valve element 51 reaches the valve-lose position before the fuel reaches the upper opening 31. As such, the outflow of fuel to the ventilation passage 34 is suppressed.

In this example embodiment, the lower ventilation holes 72 of the plate 70 are arranged to face the bottom face of the float 50, and therefore fuel collides with the bottom face of the float 50, although fuel vapor can easily enter the float chamber 35 via the ventilation spaces 64, and therefore the flow of fuel toward the passage 67 is weakened. This contributes, together with the foregoing effect of the upper wall 36, to further suppressing the outflow of fuel to the ventilation passage 34. Further, the above-described structure provides another advantage, as well as the advantage that the fuel flowing into the float chamber 35 via the lower ventilation holes 72 collides with the bottom face of the float 50 so that the fuel flow is suppressed. That is, when fuel collides with the bottom face of the float 50, it helps lift the float 50 up, and therefore the time needed for the valve element 51 to reach the valve seat 33 decreases. Thus, the outflow of fuel to the ventilation passage 34 can be further suppressed. In this example embodiment, in order to deal with the fuel entering the float chamber 35 via the lower ventilation holes 72, the fuel-outflow check valve 20 incorporates the technique related to the upper wall 36 and the technique related to the arrangement of the lower ventilation holes 72. However, alternatively, only one of them may be incorporated.

Further, when the valve element 51 is at the valve-open position, the side ventilation holes 40 of the casing 30 face the side wall face 55a of the ring portion 55 at the upper edge of the float 50, and, as indicated by the white arrow in FIG. 1, the fuel that attempts to enter the float chamber 35 via the side ventilation holes 40 collides with the side wall face 55a of the ring portion 55 and thus the fuel flow is weakened, whereby the outflow of fuel to the ventilation passage 34 is suppressed. Note that the upper ends of the side ventilation holes 40 are located at the same height as or lower than the upper edge of the float 50, that is, the upper edge of the side wall face 55a of the ring portion 55, and therefore the flow of fuel entering the float chamber 35 via the side ventilation holes 40 can be further suppressed.

Next, in the valve-close state where the valve element 51 of the float 50 is in contact with the valve seat 33 as shown in the left side of FIG. 1, the side opening 53 formed below the side wall face 55*a* of the ring portion 55 face the side ventilation holes 40 of the casing 30. Thus, the fuel that enters the area above the float 50 after the fuel-outflow check valve 20 was closed is promptly returned to the fuel tank via the upper opening 52, the passage 54, the side opening 53, and the side ventilation holes 40, as indicated by the black arrow in FIG. 1, before the fuel-outflow check valve 20 is opened. Because the passage 54 is slanted in a tapered form, the time needed to return the fuel to the fuel tank decreases accordingly. Meanwhile, the lower end of each side ventilation hole 40 or the lower end of the side opening 53 is located at the same height as or lower than the lower end of the slanted face 56 of the passage 54, and this arrangement helps return fuel from the passage 54 to the fuel tank reliably.

While the ring portion 55 is provided at the upper edge of the float 50 in the structure described above, the ring portion 55 can be omitted if appropriate. In this case, for example, the top face of the float 50 may be slanted. In this case, it is impossible to suppress the flow of fuel entering the float chamber 35 via the side ventilation holes 40 when the valve element 51 is at the valve-open position, however this problem can be solved using a shield member that will be described later or using a cylindrical member that will be described later as well.

While the technique related to the upper wall 36, the technique related to the arrangement of the lower ventilation holes 72, and the technique related to the side wall face 55*a*, and the technique related to the passage 54 are incorporated in the fuel-outflow check valve in this example, only one of these techniques may be incorporated, or two or three of them may be incorporated in various combinations.

Meanwhile, the main function of the fuel-outflow check valve 20 is to ventilate the fuel tank, and therefore, in view of ventilation performance, the side ventilation holes 40 are preferably made large in size. In view of preventing the outflow of fuel to the ventilation passage 34, however, the side ventilation holes 40 need to be made as small as possible and the passage 67 leading to the lower ventilation holes 72 needs to be made large in size. If the passage 67 is made large, however, the outflow of fuel increases, and thus the possibility of the fuel flowing out to the ventilation passage 34 increases accordingly. In the first example embodiment of the invention, because the above-described structure reduces the amount of the fuel flowing into the float chamber 35 via the side ventilation holes 40, the side ventilation holes 40 can be made larger and the passage 67 can be made narrower. For example, the diameter of each side ventilation hole 40 may be increased from 2 mm, which is the normal diameter, to 2.8 mm and the width of the passage 67 may be reduced from 1.8 mm, which is the normal width, to 1.2 mm. The narrower the passage 67, the smaller the fuel-outflow check valve 20 can be made.

In the first example embodiment, as described above, the upper wall that extends toward the inner side of the casing, and therefore, when the vehicle is starting from standstill, when the vehicle is coming to a stop, when the vehicle is cornering, or the like, the fuel flowing into the casing from the lower side or from the side below the upper wall collides with the upper wall, whereby the flow of fuel is weakened and thus the outflow of fuel to the canister side can be suppressed.

In the first example embodiment, as described above, the side wall of the float is arranged to face the side ventilation holes when the valve element is at the valve-open position, and thus the fuel flowing laterally into the casing collides with the side wall portion, whereby the flow of the fuel is weakened and thus the outflow of fuel to the canister side is suppressed accordingly.

In the first example embodiment, the downwardly slanted face is formed in the upper side of the float or the top face of the float is slanted downwardly such that, when the valve element is at the valve-close position, the lower end of the slanted face faces the side ventilation holes. According to this structure, the fuel gathered on the float can be quickly returned to the fuel tank via the slanted face and the side ventilation holes when the vehicle is starting from standstill, when the vehicle is coming to a stop, when the vehicle is cornering, or the like.

In the first example embodiment, the downwardly slanted passage is provided in the upper side of the float, which extends between the upper opening and the side opening of the float, and the portion of the side wall of the float above where the side opening is formed faces the side ventilation holes when the valve element is at the valve-open position, and the side opening faces the side ventilation holes when the valve-element is at the valve-close position. According to this structure, the fuel flowing laterally into the casing collides with the sidewall of the float, whereby the flow of the fuel is weakened and thus the outflow of fuel to the canister side is suppressed. Further, when the valve element is at the valve-close position, the fuel gathered on the float can be quickly returned to the fuel tank via the slanted face and the side ventilation holes.

In the first example embodiment, when the valve element is at the valve-open position, the upper ends of the side ventilation holes are located at the same height as or lower than the top face of the float. This arrangement helps ensure that, when the vehicle is starting from standstill, when the vehicle is coming to a stop, when the vehicle is cornering, or the like, the fuel flowing laterally into the casing collides with the side wall of the float and the flow of the fuel is weakened. Thus, the outflow of fuel to the canister side can be more reliably suppressed.

In the first example embodiment, when the valve element is at the valve-close position, the lower ends of the side ventilation holes are located at the same level as or lower than the lower end of the slanted face of the float or the lower ends of the side openings. This arrangement helps return the fuel gathered on the float quickly to the fuel tank via the slanted face and the side-ventilation holes when the vehicle is starting from standstill, when the vehicle is coming to a stop, when the vehicle is cornering, or the like.

In the first example embodiment, the plate is provided at the bottom of the casing to support the float, and the lower ventilation holes are formed in the plate such that the lower ventilation holes face the bottom portion of the float. According to this structure, when the vehicle is starting from standstill, when the vehicle is coming to a stop, when the vehicle is cornering, or the like, the fuel flowing into the casing from the lower side pushes the bottom portion of the float, whereby the closing motion of the valve element is accelerated and thus the outflow of fuel to the canister side can be suppressed more reliably.

Second Example Embodiment

Figure 9:
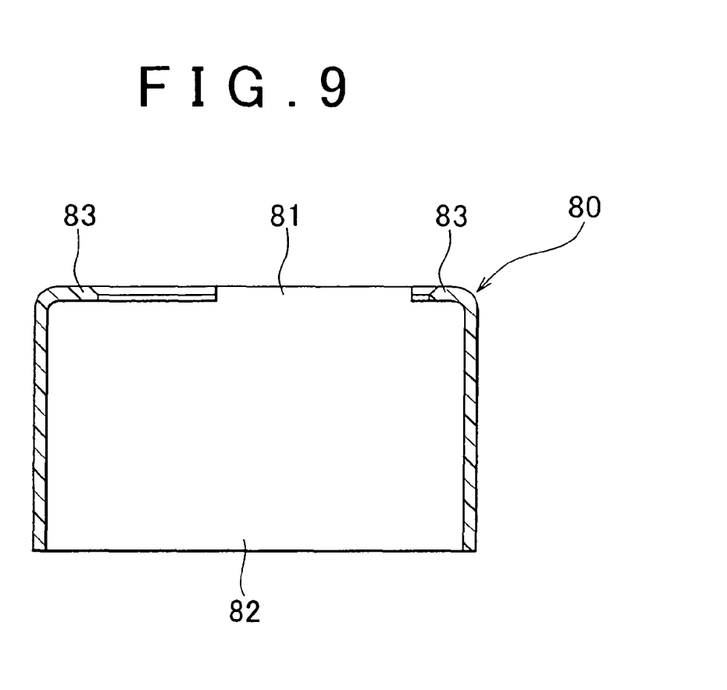
FIG. 9 is a cross-sectional view of a shield member of the fuel-outflow check valve according to the example embodiment of the invention.
Figure 10:
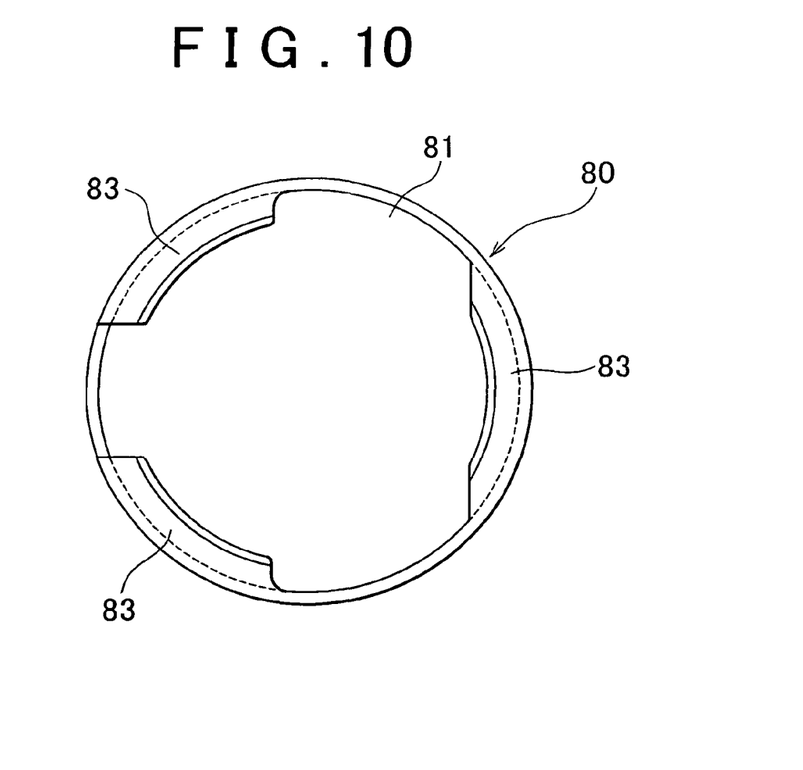
FIG. 10 is a top view of the shield member of the fuel-outflow check valve according to the example embodiment of the invention.

FIG. 8 is a cross-sectional view of a fuel-outflow check valve according to the second example embodiment of the invention. FIG. 9 is a cross-sectional view of a shield member used in the second example embodiment. FIG. 10 is a top view of the shield member. Note that the structure of the fuel-outflow check valve of the second example embodiment is the same as that of the first example embodiment and therefore it is not described here again.

In the second example embodiment, a shield member 80 is provided around the casing 30 such that the shield member 80 surrounds the side ventilation holes 40 of the casing 30. The shield member 80 is a cylindrical resin-made member having an upper opening 81 and a lower opening 82, and the shield member 80 is larger in diameter but smaller in height than the casing 30.

The lower side of the shield member 80 is straight, and three arc-shaped attachment ledges 83 are provided, as indicated in FIG. 10, at even intervals on the outer peripheral edge of the shield member 80 by which the upper opening 81 is defined. The attachment ledges 83 are snap-fit to the annular attachment groove 41 formed in the outer peripheral face of the casing 30.

The shield member 80 is attached to the casing 30 such that the side ventilation holes 40 are entirely covered by the shield member 80. Therefore, if fuel flows toward the side ventilation holes 40 as indicated by the white arrow in FIG. 8, the fuel is blocked by the shield member 80 and thus it can not enter the side ventilation holes 40. While the shield member 80 is cylindrical in this example embodiment, it may alternatively be formed in an arc-shape as long as it can block the fuel flowing toward the side ventilation holes 40. Further, the type of attachment of the shield member 80 is not limited to the snap-fitting type. For example, the shield member 80 may be attached by welding, heat-swaging, adhesion, screwing, and so on.

In the second example embodiment, as described above, the shield member 80 is added to the fuel-outflow check valve of the first example embodiment, that is, to a fuel-outflow check valve incorporating the technique related to the upper wall 36, the technique related to the arrangement of the lower ventilation holes 72, the technique related to the side wall face 55*a*, and the technique related to the passage 54. In the second example embodiment, however, because the shield member 80 prevents fuel from flowing into the casing 30 via the side ventilation holes 40, the sidewall face 55*a* may be omitted. Further, in the second example embodiment, only one of the technique related to the upper wall 36 and the technique related to the arrangement of the lower ventilation holes 72 may be incorporated or both of them may be incorporated.

In the second example embodiment, because the shield member is provided on the outer side of the side ventilation holes across an interval, therefore, when the vehicle is starting from standstill, when the vehicle is coming to a stop, when the vehicle is cornering, or the like, the fuel flowing laterally into the casing collides with the shield member. Thus, the flow of the fuel is blocked, and therefore the outflow of fuel to the canister side can be more reliably suppressed.

Third Example Embodiment

Figure 11:
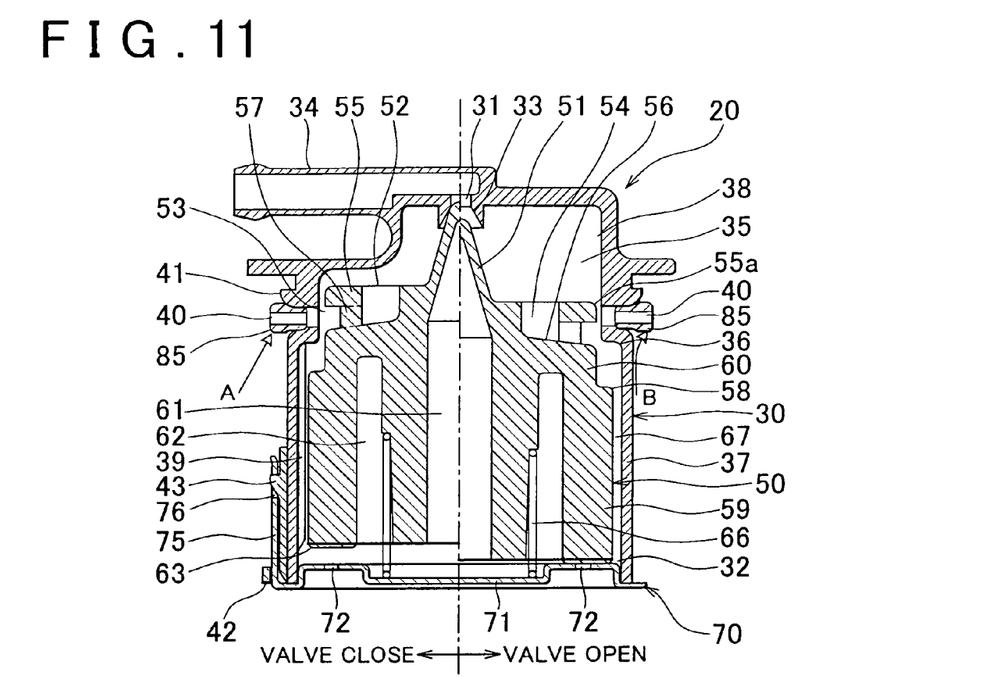
FIG. 11 is a cross-sectional view of a fuel-outflow check valve according to another example embodiment of the invention.

FIG. 11 is a cross-sectional view of a fuel-outflow check valve according to the third example embodiment of the invention. Note that the structure of the fuel-outflow check valve of the third example embodiment is the same as that of the first example embodiment and therefore it is not described here again.

In the third example embodiment, cylindrical members 85 are provided at the respective side ventilation holes 40 of the casing 30 so as to project outward. The cylindrical members 85 are resin-made hollow members. The cylindrical members 85 may either be formed integrally at the side ventilation holes 40 or provided as separate parts and attached to the respective side ventilation holes 40 by welding or using adhesives. Because the cylindrical members 85 project outward from the side ventilation holes 40, even if fuel flows toward the side ventilation holes 40 as indicated by the white arrow A in FIG. 11, the fuel is blocked by the cylindrical members 85 and thus it can not enter the side ventilation holes 40. Further, due to the presence of the cylindrical members 85, fuel flows along the outer face of the casing 30 as indicated by the white arrow B in FIG. 11, and thus the fuel is unlikely to enter the side ventilation holes 40.

In the third example embodiment, the cylindrical members 85 are added to the fuel-outflow check valve of the first example embodiment, that is, to a fuel-outflow valve incorporating the technique related to the upper wall 36, the technique related to the arrangement of the lower ventilation holes 72, the technique related to the side wall face 55*a*, and the technique related to the passage 54. However, because the cylindrical members 85 prevent fuel from entering the casing 30 via the side ventilation holes 40, the side wall face 55*a* may be omitted. Further, in the third example embodiment, only one of the technique related to the upper wall 36 and the technique related to the arrangement of the lower ventilation holes 72 may be incorporated or both of them may be incorporated. Further, the shield member 80 of the second example embodiment may be incorporated in addition to the cylindrical members 85.

According to the third example embodiment, when the vehicle is starting from standstill, when the vehicle is coming to a stop, when the vehicle is cornering, or the like, the fuel flowing laterally into the casing is blocked by the cylindrical members projecting outward from the side ventilation holes, and therefore the outflow of fuel to the canister side can be suppressed more reliably.

What is claimed is:

1. A fuel-outflow check valve, comprising:
   a casing, at least one portion of which is located in a fuel tank, the casing having a side ventilation hole formed in a side portion of the casing such that an interior of the casing and an interior of the fuel tank communicate with each other via the side ventilation hole;
   a float that is disposed in the interior of the casing and is vertically movable;
   a valve element that is provided on the float and can contact a valve seat formed at the casing, wherein when the valve element is at a valve-open position, a sidewall of the float and the side ventilation hole face each other; and
   a distance from the sidewall of the float to the side ventilation hole that face each other when the valve element is at the valve-open position is smaller than a distance from an uppermost surface of a slanted face of the float to the side ventilation hole when the valve element is at a valve-close position, wherein the uppermost surface of the slanted face faces the side ventilation hole when the valve element is at the valve-close position, as viewed in a direction perpendicular to an axis of the float.

2. The fuel-outflow check valve according to claim 1, wherein when the valve element is at the valve-open position, an upper end of the side ventilation hole of the casing is located at a same height as or lower than a top face of the float.

3. The fuel-outflow check valve according to claim 1, further comprising:
   a plate arranged in a lower side of the casing so as to support the float and having a lower ventilation hole facing a bottom portion of the float.

4. The fuel-outflow check valve according to claim 1, further comprising:
   a shield member that is provided on an outer side of the side ventilation hole of the casing across an interval.

5. The fuel-outflow check valve according to claim 1, further comprising:
a cylindrical member protruding outward from the side ventilation hole of the casing.

6. The fuel-outflow check valve according to claim 1, wherein only when the valve element is at the valve-close position, a lower end of the slanted face of a top face of the float is aligned in a same plane as the side ventilation hole of the casing, the plane being perpendicular to the axis of the float.

7. The fuel-outflow check valve according to claim 1, wherein when the valve element is at the valve-close position, a lower end of the side ventilation hole of the casing is located at a same height as or lower than the lower end of the slanted face of a top face of the float.

8. The fuel-outflow check valve according to claim 1, wherein the side wall of the float comprises a ring portion, the ring portion provided over the slanted face, the ring portion facing the side ventilation hole when the valve element is at the valve-open position.

9. A fuel-outflow check valve, comprising:
a casing, at least one portion of which is located in a fuel tank, the casing having a side ventilation hole formed in a side portion of the casing such that an interior of the casing and an interior of the fuel tank communicate with each other via the side ventilation hole;
a float which is disposed in the interior of the casing and is vertically movable, the float consisting of one member, an upper opening and a side opening being formed in an upper portion of the float, the upper opening and the side opening being connected via a passage that is slanted downwardly;
a valve element that is provided on the float and can contact a valve seat formed at the casing, wherein the valve element is provided on an upper side of the float than the upper opening, the upper opening is radially offset from the valve element, and when the valve element is at a valve-close position, a lower end of the slanted passage faces the side ventilation hole of the casing; and
a ventilation passage that connects the casing to a canister such that the casing and the canister communicate with each other via the ventilation passage,
wherein the valve element does not include an aeration passage to allow air from the casing to the canister via the ventilation passage in the valve-close position, and
wherein the slanted passage does not face the side ventilation hole as viewed in a direction perpendicular to an axis of the float when the valve element is at a valve-open position.

* * * * *